(12) United States Patent
Hunger

(10) Patent No.: US 10,559,967 B2
(45) Date of Patent: Feb. 11, 2020

(54) SWITCHABLE INTERFACE FOR POWER TOOLS

(71) Applicant: Hilti Aktiengesellschaft, Schaan (LI)

(72) Inventor: Markus Hunger, Augsburg (DE)

(73) Assignee: Hilit Aktiengesellschaft, Schaan (LI)

( * ) Notice: Subject to any disclaimer, the term of this patent is extended or adjusted under 35 U.S.C. 154(b) by 254 days.

(21) Appl. No.: 15/532,853

(22) PCT Filed: Dec. 17, 2015

(86) PCT No.: PCT/EP2015/080134
§ 371 (c)(1),
(2) Date: Jun. 2, 2017

(87) PCT Pub. No.: WO2016/097081
PCT Pub. Date: Jun. 23, 2016

(65) Prior Publication Data
US 2017/0346324 A1 Nov. 30, 2017

(30) Foreign Application Priority Data
Dec. 18, 2014 (EP) ..................................... 14198728

(51) Int. Cl.
*H02J 7/00* (2006.01)
*B25F 5/02* (2006.01)

(52) U.S. Cl.
CPC .............. *H02J 7/0063* (2013.01); *B25F 5/02* (2013.01); *H02J 2007/0067* (2013.01)

(58) Field of Classification Search
CPC ... H02J 7/0063; H02J 2007/0067; B25F 5/00; B25F 5/02
See application file for complete search history.

(56) References Cited

U.S. PATENT DOCUMENTS 4,779,687 A 10/1988 Schreiber et al.
8,733,470 B2 5/2014 Matthias et al.
(Continued)

FOREIGN PATENT DOCUMENTS

DE 102008040061 1/2010
EP 0238718 9/1987
(Continued)

OTHER PUBLICATIONS

International Search Report of PCT/EP2015/080134, dated May 2, 2016, 2 pages.

*Primary Examiner* — Carlos Amaya
(74) *Attorney, Agent, or Firm* — Davidson, Davidson & Kappel, LLC

(57) ABSTRACT

Disclosed is a power tool including a control device and at least one electromechanical interface device for connecting at least one rechargeable battery to the machine tool and supplying the power tool with voltage from the rechargeable battery. The interface device includes at least a first terminal and a second terminal and can be set to at least one first position and to a second position; the first terminal can be used for supplying the power tool with voltage from the first rechargeable battery when the interface device is in the first position, and the second terminal can be used for supplying the power tool with voltage from the second rechargeable battery when the interface device is in the second position.

5 Claims, 14 Drawing Sheets

(56) References Cited

U.S. PATENT DOCUMENTS

| | | |
|---|---|---|
| 9,570,929 B2 | 2/2017 | Seiler et al. |
| 2005/0077873 A1 | 4/2005 | Watson et al. |
| 2006/0087286 A1* | 4/2006 | Phillips .................... B25F 5/00 320/114 |
| 2013/0130552 A1* | 5/2013 | Ota ...................... H01R 31/065 439/620.21 |

FOREIGN PATENT DOCUMENTS

| | | |
|---|---|---|
| EP | 1559511 | 8/2005 |
| WO | WO2012/084394 | 6/2012 |

* cited by examiner

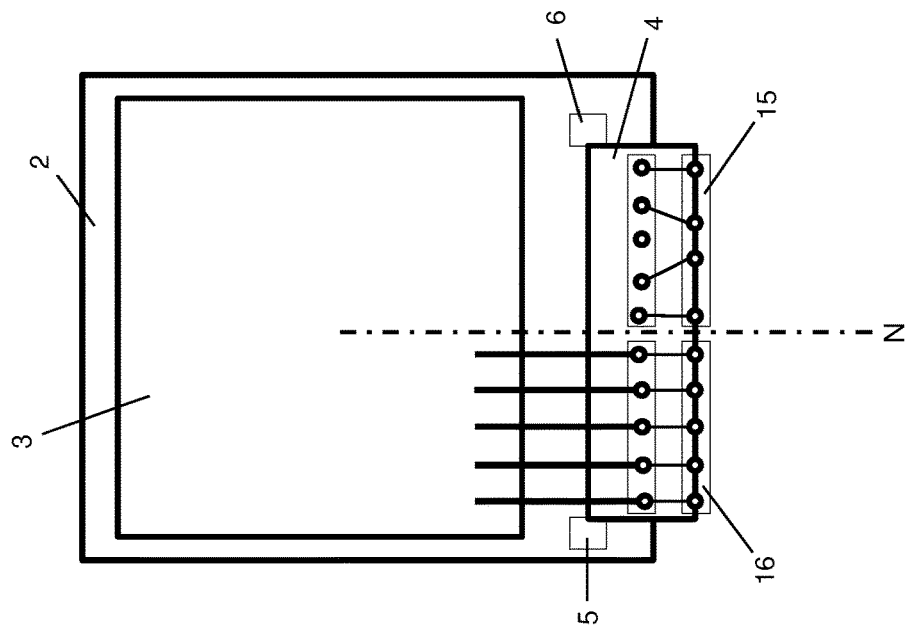
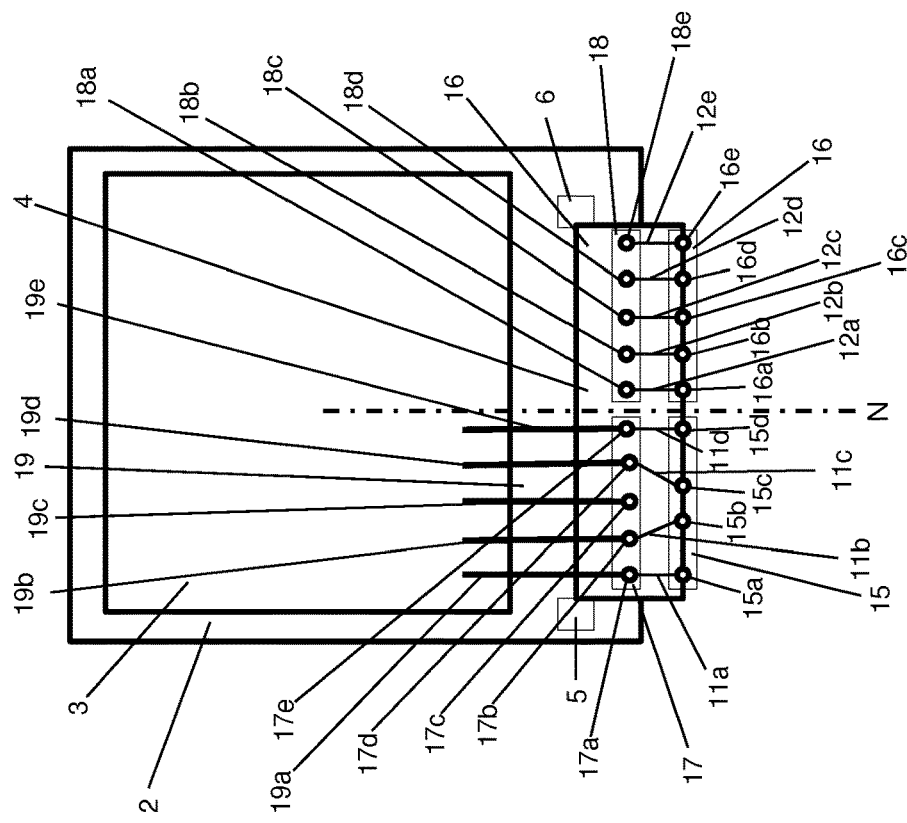

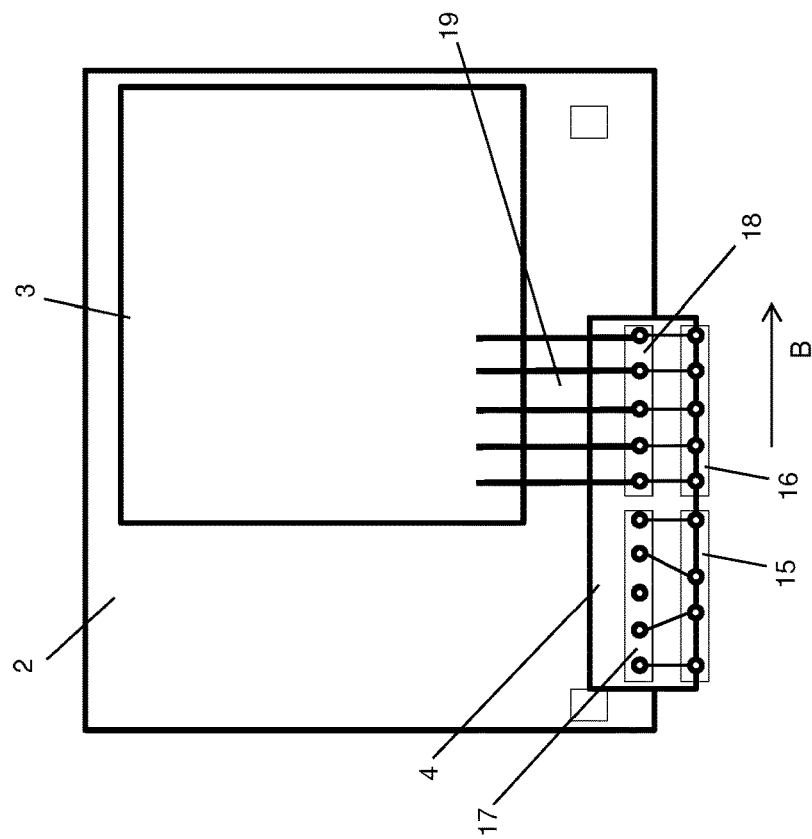
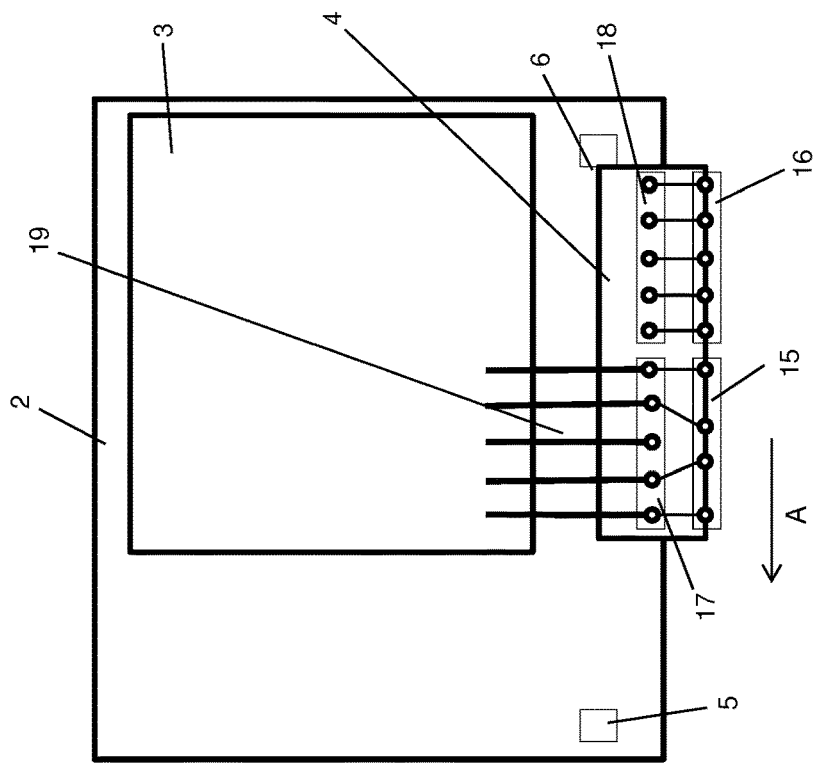

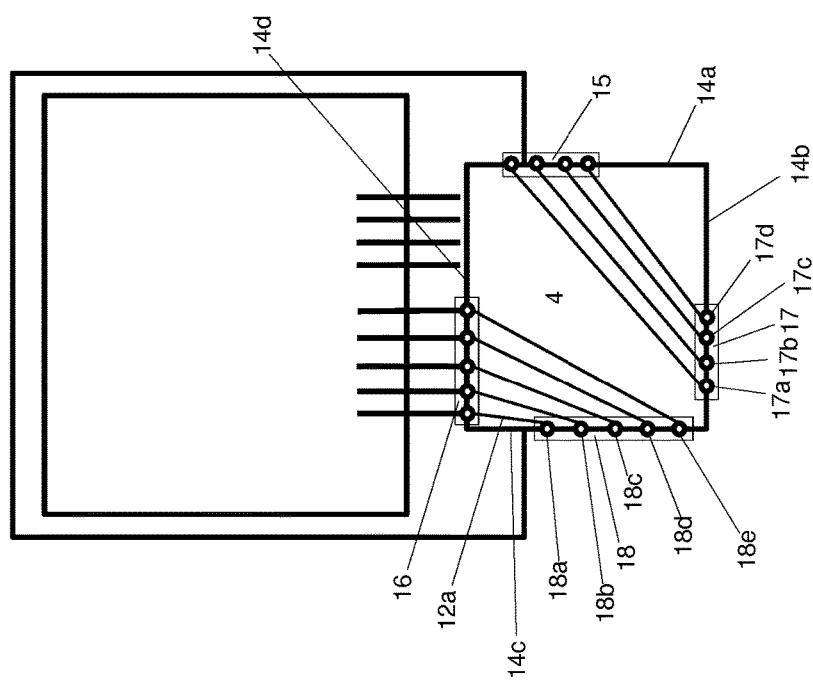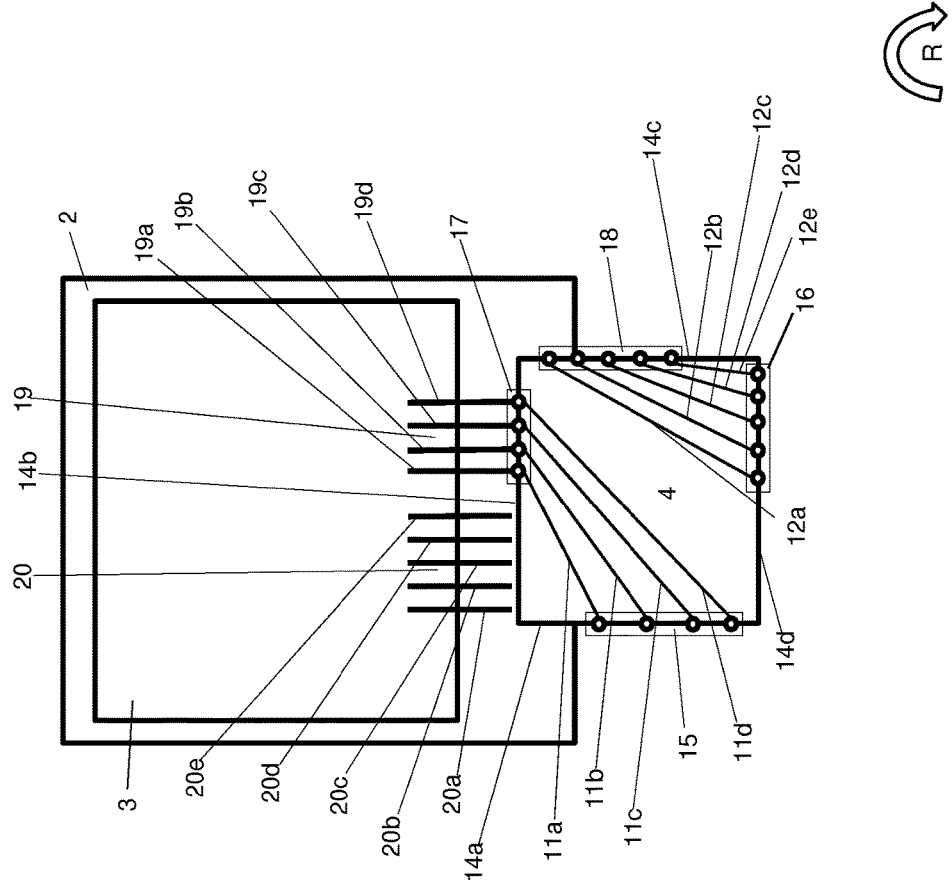

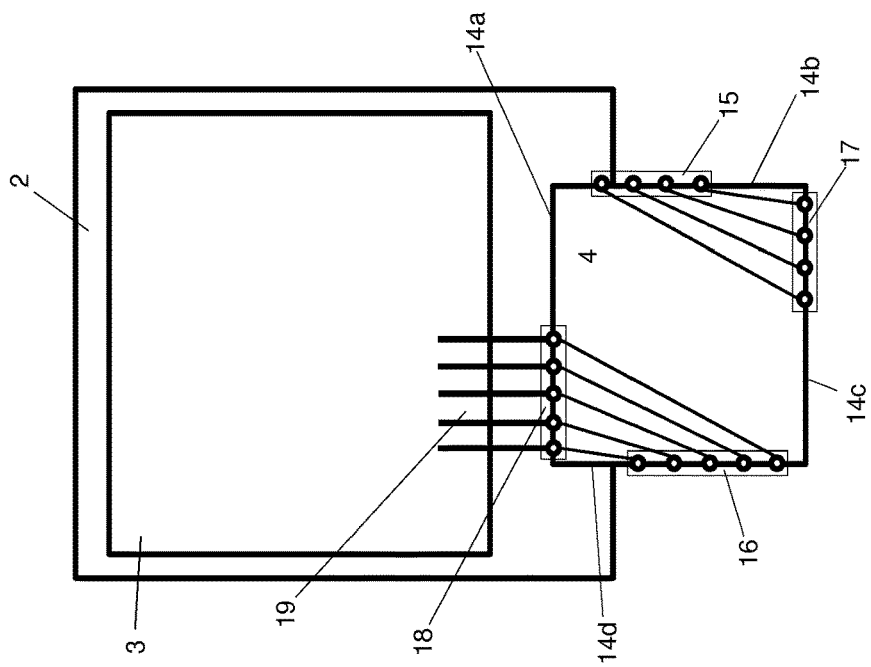
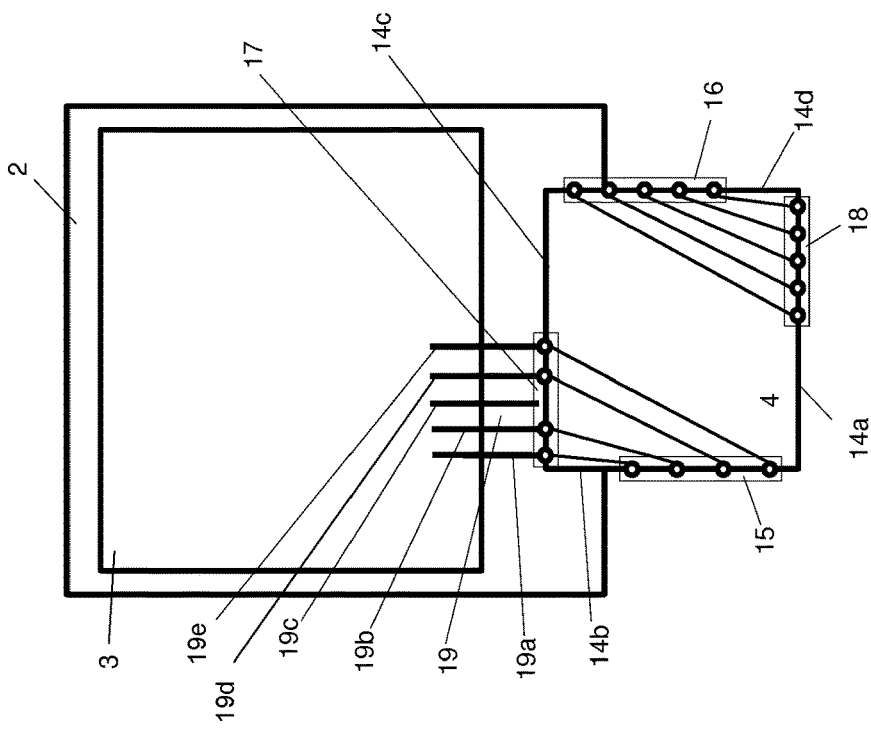

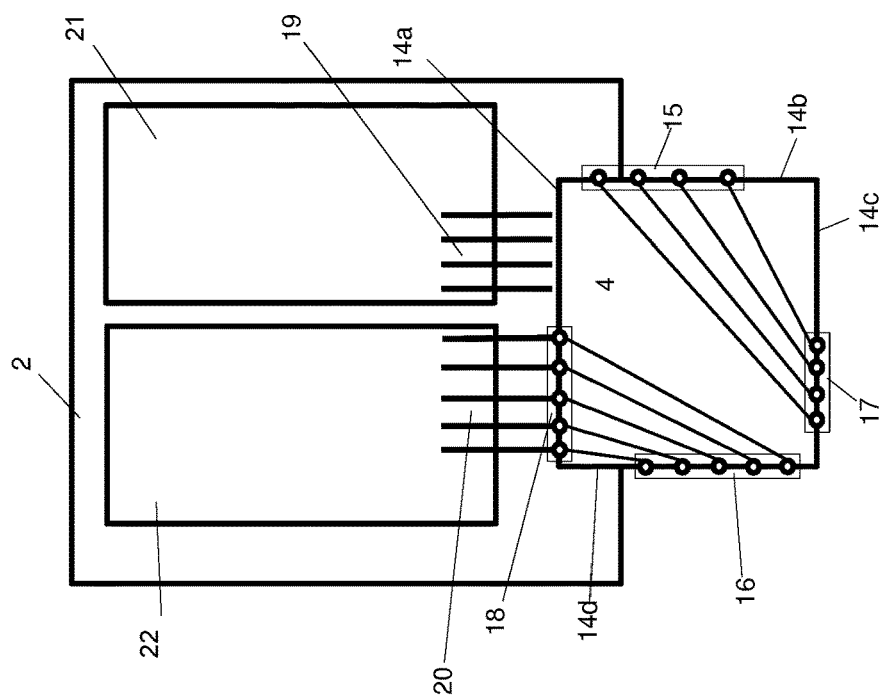
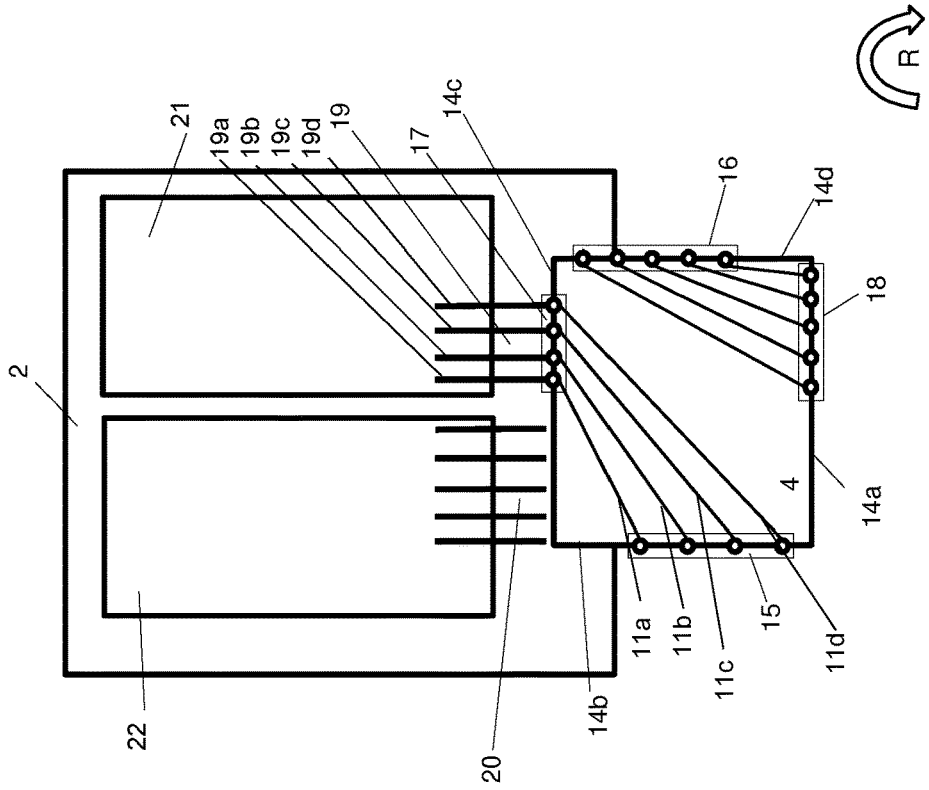

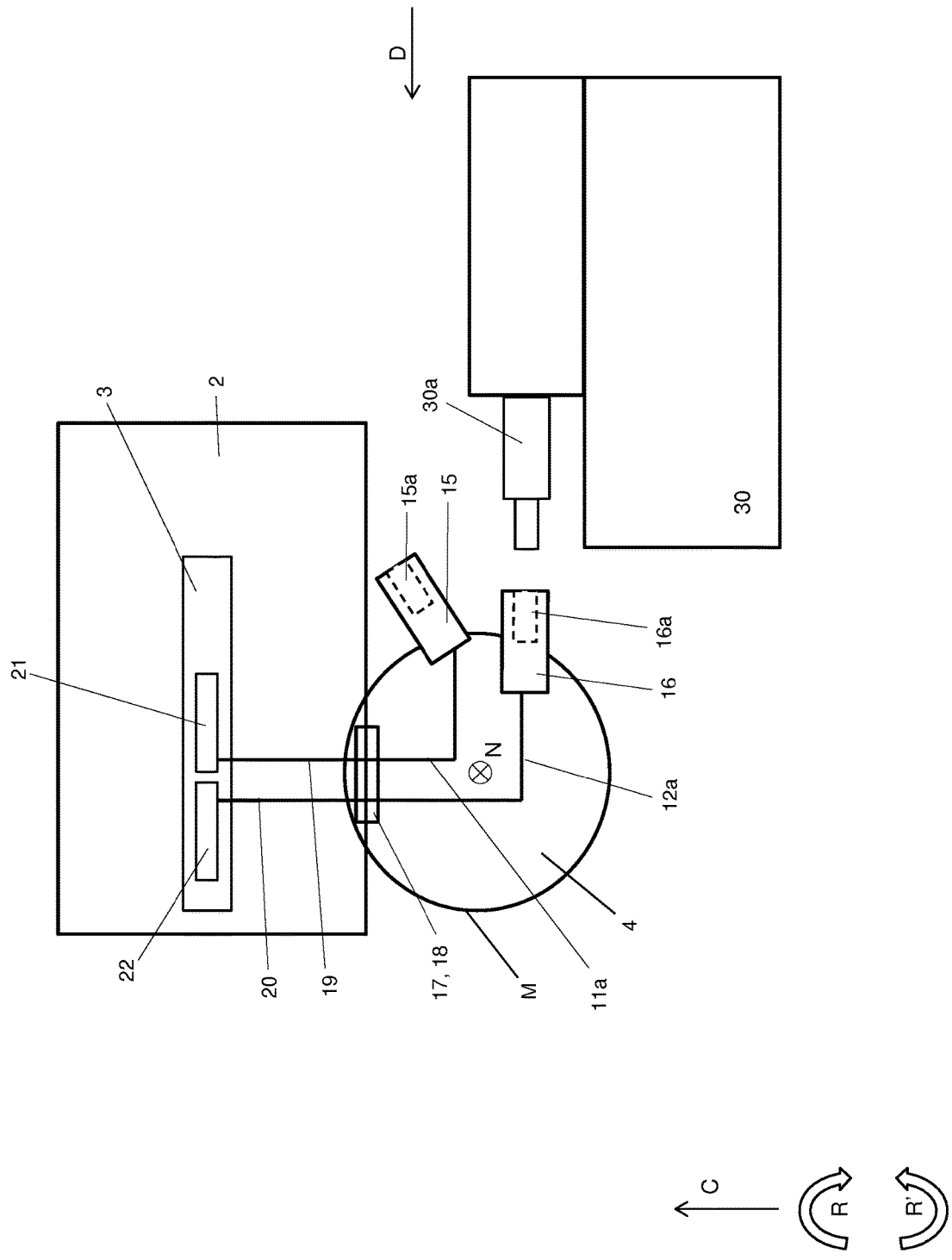

SWITCHABLE INTERFACE FOR POWER TOOLS

The present invention relates to a power tool, including a control device and at least one electromechanical interface device for connecting at least one rechargeable battery to the power tool as well as for supplying the power tool with voltage from the rechargeable battery.

BACKGROUND

Electrical power tools, for example hammer drills, buzz saws, angle grinders or the like, are frequently supplied with voltage with the aid of a rechargeable battery. The storage batteries are usually designed in such a way that they may be connected to and then disconnected from the power tool. The detachable connection between the rechargeable battery and the power tool is used, among other things, to replace a rechargeable battery which has been depleted by working with the power tool with a rechargeable battery in which voltage is stored for output to the power tool.

A regular replacement of a heavily utilized rechargeable battery with a new, more powerful rechargeable battery is not an unusual undertaking. However, since the power tool is not necessarily also replaced together with the rechargeable battery, the problem frequently arises that the new rechargeable battery is not identical to the old, i.e. original, rechargeable battery. Due to further development measures, it may be possible that the new rechargeable battery includes a new electromechanical interface device which does not fit the corresponding interface of the power tool or is incompatible with the interface of the power tool As a result, an incompatibility problem may exist between different storage batteries and the power tool, whereby different storage batteries may not be connected to one and the same interface of the power tool.

SUMMARY OF THE INVENTION

It is an object of the present invention to provide a power tool, with the aid of which the compatibility between the rechargeable battery and the power tool is improved.

A power tool is provided, which includes a control device and at least one electromechanical interface device for connecting at least one rechargeable battery to the power tool as well as for supplying the power tool with voltage from the rechargeable battery.

According to the present invention, it is provided that the interface device includes at least one first terminal and a second terminal, and the interface device is settable to at least one first position and to a second position, the first terminal being able to be used to supply the power tool with voltage from a first rechargeable battery when the interface device is set in the first position, and the second terminal being able to be used to supply the power tool with voltage from a second rechargeable battery when the interface device is set in the second position.

According to another advantageous specific embodiment of the present invention, it may be possible that the first terminal includes a first number of terminal elements, and the second terminal includes a second number of terminal elements, the first number of terminal elements corresponding to a number of contact elements of the first rechargeable battery, and the second number of terminal elements corresponding to a number of contact elements of the second rechargeable battery. The terminal of the interface device to which the corresponding rechargeable battery is to be connected is hereby easily indicated to the user of the power tool.

To easily ensure a correct supply of the power tool with voltage via a rechargeable battery correspondingly connected to the power tool, it may be possible, according to another advantageous specific embodiment of the present invention, that a first configuration is selected for supplying the power tool with voltage from a first rechargeable battery when the interface device is set in the first position and the first rechargeable battery is connected to the first terminal, and a second configuration is selected for supplying the power tool with voltage from a second rechargeable battery when the interface device is set in the second position and the second rechargeable battery is connected to the second terminal.

According to another advantageous specific embodiment of the present invention, it may be possible that the interface device includes a connecting point having a number of connecting elements for connecting the interface device to the control device, the number of connecting elements corresponding to the greater number of terminal elements of the first or second terminal. This may ensure that both the first terminal having a first number of terminal elements and the second terminal having a second number of terminal elements are connectable to the connecting point.

According to another advantageous specific embodiment of the present invention, it may be possible that the interface device includes a first connecting point and a second connecting point for connecting the interface device to the control device, the first connecting point including a first number of connecting elements and the second connecting point including a second number of connecting elements, the first number of connecting elements corresponding to the first number of terminal elements, and the second number of connecting elements corresponding to the second number of terminal elements. By using a first and a second connecting point, it is possible to use a relatively easily constructed or simple electronic system to supply the power tool with voltage from the rechargeable battery, since a clear determination of the first or second position of the interface device or the first or second rechargeable battery exists based on the particular connection of the first or second terminal to the corresponding first or second connecting point. The electronic system used here to control the supply of the power tool with voltage may therefore be designed without a device for detecting the first or second position of the interface device or for detecting the particular first or second rechargeable battery connected to the interface device.

According to another advantageous specific embodiment of the present invention, it may be possible that the first or second position of the interface device and/or the first or second rechargeable battery connected to the interface device is/are detectable based on the number of connections between terminal elements and connecting elements. The detection of the first or second position of the interface device or the detection of the particular first or second rechargeable battery connected to the interface device may be easily configured hereby.

According to another advantageous specific embodiment of the present invention, it may be possible that at least one terminal element of the first terminal as well as at least one terminal element of the second terminal is configured at least to receive information from the first rechargeable battery and the second rechargeable battery at the power tool, so that a first configuration for supplying the power tool with voltage from a first rechargeable battery or a second configuration for supplying the power tool with voltage from a second rechargeable battery is settable according to the particular first or second rechargeable battery connected.

To ensure a preferably easy and reliable detection of the interface device in the first or second position for the charging device, according to another advantageous specific embodiment of the present invention, it may be possible that at least one microswitch is provided to detect whether the interface device is set in the first position or the second position. The microswitch may be positioned, for example, between the interface device and a housing of the charging device.

Other advantages result from the following description of the figures. The figures illustrate different exemplary embodiments of the present invention. The figures, the description and the claims contain numerous features in combination. Those skilled in the art will advantageously also consider the features individually and combine them to form other meaningful combinations.

BRIEF DESCRIPTION OF THE DRAWINGS

In the figures, identical and equivalent components are provided with identical reference numerals.

FIG. 3 shows a schematic view of the interface device in the first position according to the first specific embodiment;

FIG. 4 shows a schematic view of the interface device in a second position according to the first specific embodiment;

FIG. 5 shows a schematic view of the interface device in a first position according to a second specific embodiment;

FIG. 6 shows a schematic view of the interface device in a second position according to the second specific embodiment;

FIG. 7 shows a schematic view of the interface device in a first position according to a third specific embodiment;

FIG. 8 shows a schematic view of the interface device in a second position according to the third specific embodiment;

FIG. 11 shows a schematic view of the interface device in a first position according to a fifth specific embodiment;

FIG. 12 shows a schematic view of the interface device in a second position according to the fifth specific embodiment;

FIG. 13 shows a schematic view of the interface device in a first position according to a sixth specific embodiment;

FIG. 14 shows a schematic view of the interface device in a second position according to the sixth specific embodiment;

FIG. 15 shows a side view of the interface device in a first position according to a seventh specific embodiment and a first rechargeable battery;

DETAILED DESCRIPTION

Figure 1:
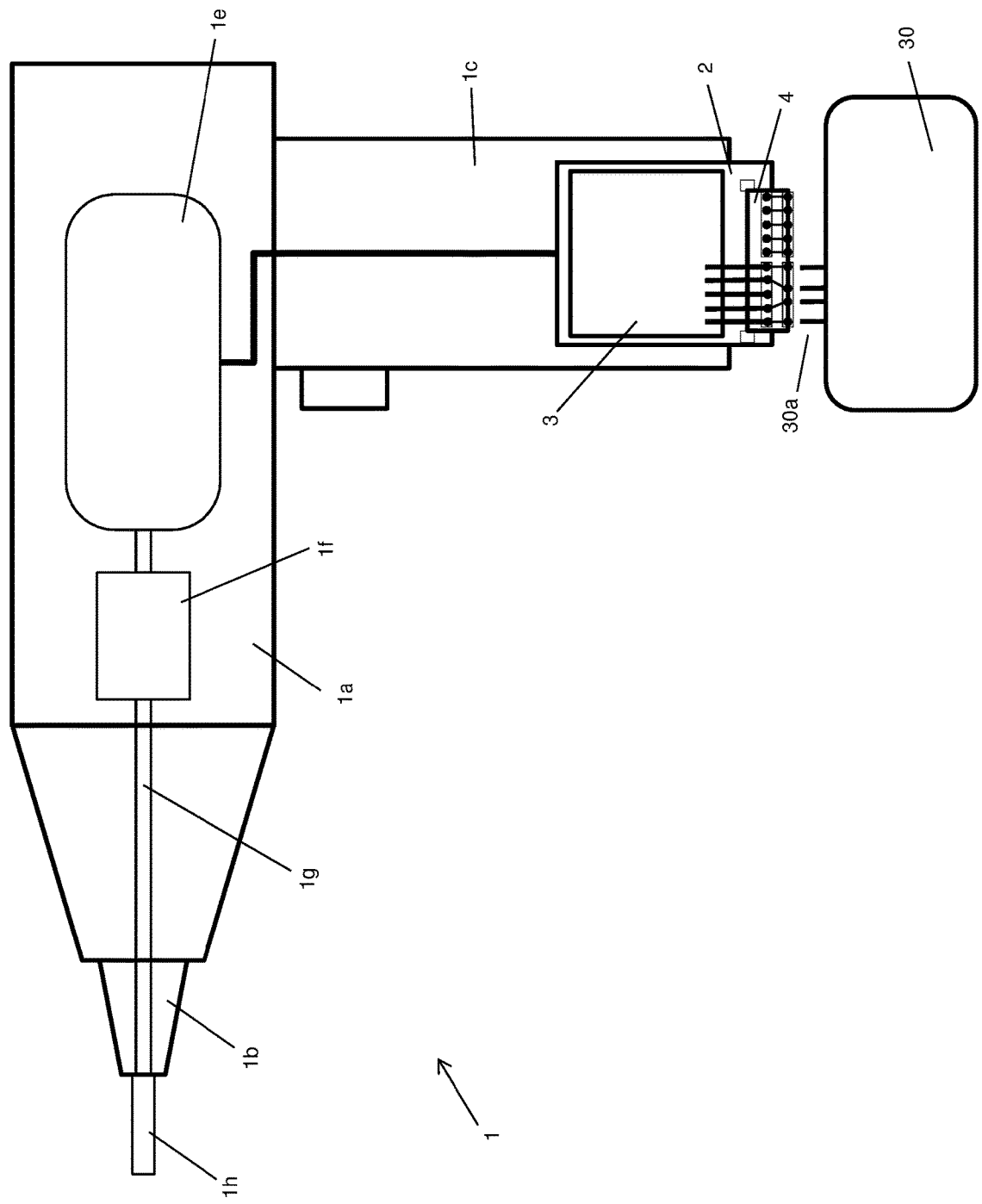
FIG. 1 shows a schematic side view of a power tool according to the present invention according to a first specific embodiment, including an interface device in a first position, together with a first rechargeable battery.
Figure 2:
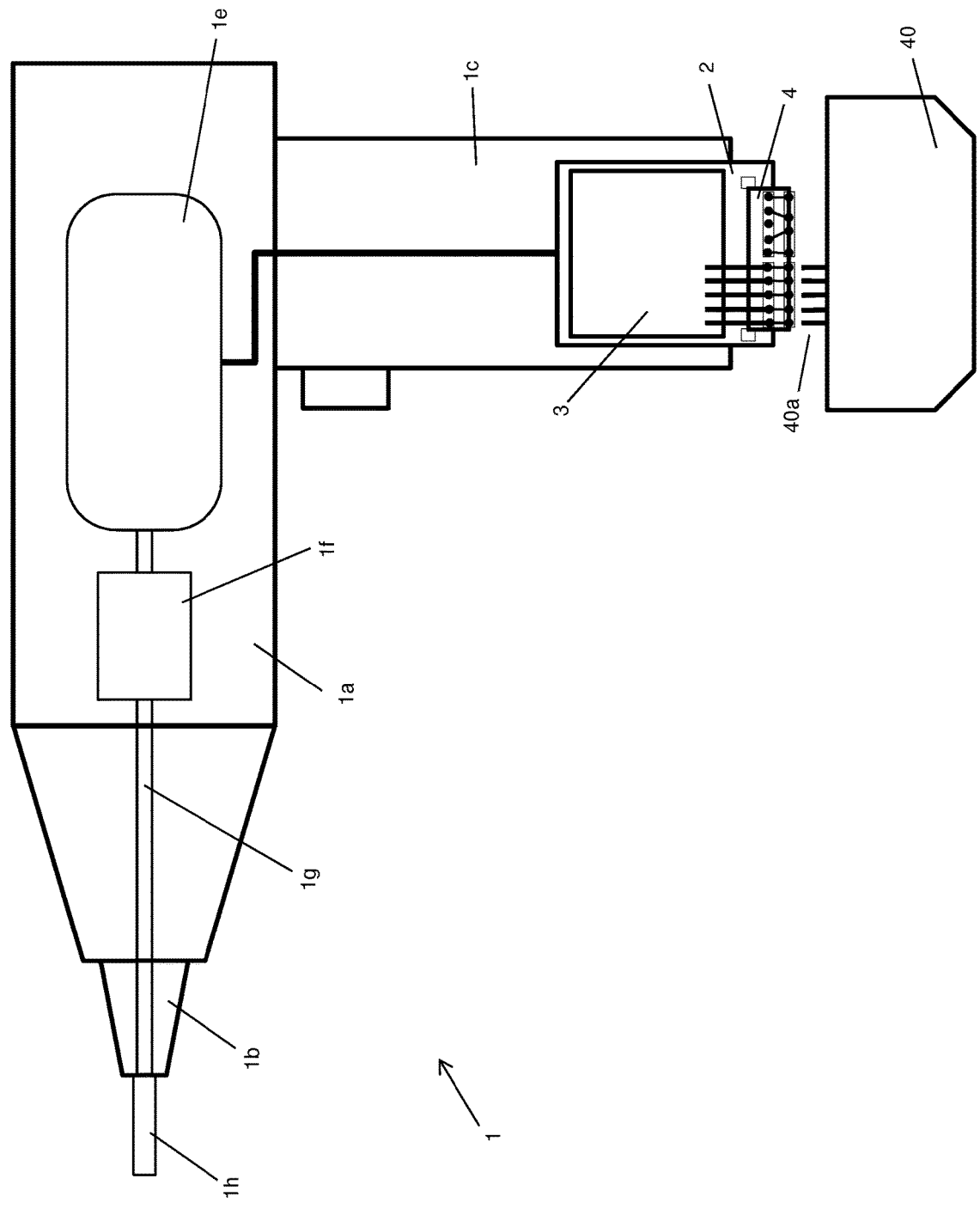
FIG. 2 shows a schematic side view of a power tool according to the present invention according to the first specific embodiment, including the interface device in a second position, together with a second rechargeable battery.

FIGS. 1 and 2 show a power tool 1 according to the present invention for charging at least one rechargeable battery according to a first specific embodiment. Power tool 1 is designed in the form of a cordless screwdriver. However, it is also possible to design power tool 1 in the form of a hammer drill, a power drill, a saw, a sander or the like.

Power tool 1 essentially includes a power tool housing 1a, a tool holder 1b, a handle 1c and a rechargeable battery holder 2. An electric motor 1e, a gear drive 1f and an output shaft 1g are situated in power tool housing 1a. A torque generated in electric motor 1e is transmitted to tool holder 1b via gear drive 1f and output shaft 1g. A tool 1h in the form of a drill may be positioned in tool holder 1b. The tool is not illustrated in the figures.

A user (not shown) is able to hold power tool 1, designed as a cordless screwdriver, by handle 1c.

Rechargeable battery holder 2 is used to accommodate and hold a first rechargeable battery 30 or a second rechargeable battery 40. Rechargeable battery holder 2 essentially includes a control device 3 and an interface device 4. Power tool 1 including first rechargeable battery 30 is illustrated in FIG. 1, and power tool 1 including second rechargeable battery 40 is shown in FIG. 2.

Interface device 4 is positioned in rechargeable battery holder 2 and handle 1c in such a way that first rechargeable battery 30 or a second rechargeable battery 40 may be connected to interface device 4 and thus to power tool 1. First rechargeable battery 30 and also second rechargeable battery 40 are used to supply power tool 1 with electrical energy, in particular with voltage. It should be noted that first rechargeable battery 30 and second rechargeable battery 40 differ from each other at least based on the number of contacts which may be used to connect first rechargeable battery 30 or second rechargeable battery 40 to interface device 4. As illustrated in FIG. 1, first rechargeable battery 30 includes four contacts 30a, with the aid of which first rechargeable battery 30 is able to transmit voltage and/or to transmit and receive information data with the aid of interface device 4. As illustrated in FIG. 2, second rechargeable battery 40 includes five contacts 40a, with the aid of which second rechargeable battery 40 is able to transmit voltage and/or to transmit and receive information data with the aid of interface device 4.

An electronic system is included on control device 3 for controlling and regulating power tool 1 and, in particular, for controlling and regulating the supply of power tool 1 with voltage from first rechargeable battery 30 or second rechargeable battery 40. Control device 3 has a first configuration for supplying power tool 1 with voltage from a first rechargeable battery 30. Control device 3 furthermore has a second configuration for supplying power tool 1 with voltage from a second rechargeable battery 40.

Control device 3 is designed in such a way that the first configuration is automatically selected and set when power tool 1 detects that first rechargeable battery 30 is connected to interface device 4. Furthermore, the second configuration is selected and set when power tool 1 detects that second rechargeable battery 40 is connected to interface device 4.

Interface device 4 is designed in such a way that voltage, information and data may be exchanged bidirectionally between charging device 1 and particular connected rechargeable battery 30, 40.

Interface device 4 includes a first terminal 15 and a second terminal 16. First terminal 15 includes four terminal elements 15a, 15b, 15c, 15d as well as five connecting elements 17a, 17b, 17c, 17d, 17e. Second terminal 16 includes five terminal elements 16a, 16b, 16c, 16d, 16e as well as five connecting elements 18a, 18b, 18c, 18d, 18e. In first terminal 15, four terminal elements 15a, 15b, 15c, 15d are connected to five connecting elements 17a, 17b, 17c, 17d, 17e via four connecting lines 11a, 11b, 11c, 11d. In second terminal 16, five terminal elements 16a, 16b, 16c, 16d, 16e are connected to five connecting elements 18a, 18b, 18c, 18d, 18e via five connecting lines 12a, 12b, 12c, 12d, 12e. In first terminal 15, four terminal elements 15a, 15b, 15c, 15d are connected to five connecting elements 17a, 17b, 17c, 17d, 17e in such a way that a connecting element 17c is not connected to one of four terminal elements 15a, 15b, 15c, 15d. Terminal elements 15a, 15b, 15c, 15d of first terminal 15 are used to be connected to contacts 30a of a first rechargeable battery 30. Terminal elements 16a, 16b, 16c, 16d, 16e of second terminal 16 are used to be connected to contacts 40a of a second rechargeable battery 40. It is thus provided that a first rechargeable battery 30 is connectable to first terminal 15, and a second rechargeable battery 40 is connectable to second terminal 16. Neither first rechargeable battery 30 nor second rechargeable battery 40 is illustrated in FIGS. 3 through 14.

According to the first specific embodiment of power tool 1, control device 3 includes a linking device 19, which has five links 19a, 19b, 19c, 19d, 19e, with the aid of which five connecting elements 17a, 17b, 17c, 17d, 17e of first terminal 15 or five connecting elements 18a, 18b, 18c, 18d, 18e of second terminal 16 are connectable to control device 3.

As illustrated in FIGS. 1 and 2, power tool 1 is designed according to the first specific embodiment in such a way that interface device 4 is settable in a first position or in a second position. In FIG. 1, interface device 4 is in the first position, and in FIG. 2, interface device 4 is in the second position.

As illustrated in FIG. 1, interface device 4 is oriented in the first position in such a way that five connecting elements 17a, 17b, 17c, 17d, 17e of first terminal 15 are connected to five links 19a, 19b, 19c, 19d, 19e of control device 3. In the first position of interface device 4, a connection of four terminal elements 15a, 15b, 15c, 15d to control device 3 via four of five connecting elements 17a, 17b, 17d, 17e exists within first terminal 15, so that rechargeable battery 30 connected to four terminal elements 15a, 15b, 15c, 15d may be supplied with voltage via control device 3.

To transfer interface device 4 from the first position to the second position, (according to the first specific embodiment of power tool 1) interface device 4 is removed from rechargeable battery holder 2 of power tool 1, rotated by 180° around axis N and refastened to rechargeable battery holder 2 of power tool 1. Interface device 4 is in the first and second position at the same point of housing 2 of charging device 1, but interface device 4 is positioned in the first and second positions in different orientations (rotated by 180° around axis N) in relation to rechargeable battery holder 2 of power tool 1. As described below on the basis of additional exemplary embodiments of power tool 1, interface device 4 may be moved or transferred from the first position into the second position in different ways.

As illustrated in FIG. 2, interface device 4 is oriented in the second position in such a way that five connecting elements 18a, 18b, 18c, 18d, 18e of second terminal 16 are connected to five links 19a, 19b, 19c, 19d, 19e of control device 3. In the second position, a connection of five terminal elements 16a, 16b, 16c, 16d, 16e to control device 3 via five connecting elements 18a, 18b, 18c 18d, 18e exists within second terminal 16, so that rechargeable battery 40 connected to five terminal elements 16a, 16b, 16c, 16d, 16e may be supplied with voltage via control device 3.

As illustrated in FIGS. 1, 2, 3 and 4, a first microswitch 5 and a second microswitch 6 are positioned in rechargeable battery holder 2 of power tool 1 in such a way that interface device 4 activates first microswitch 5 when interface device 4 is in the first position and activates second microswitch 6 when interface device 4 is in the second position. Power tool 1 detects whether interface device 4 is in the first or second position by the particular activation of first or second microswitch 5, 6. First and second microswitches 5, 6 are correspondingly connected to control device 3.

In addition, power tool 1 detects whether interface device 4 is in the first or second position based on the number of connections between terminal elements 15a, 15b, 15c, 15d, 16a, 16b, 16c, 16d, 16e and connecting elements 17a, 17b, 17c, 17d, 17e, 18a, 18b, 18c, 18d, 18e. For this purpose, power tool 1 detects that, in the first position of interface device 4, middle connecting element 17c is not connected to a terminal element 15a, 15b, 15c, 15d of first terminal 15 (cf. FIG. 1). Control device 3 detects whether interface device 4 is in the first position and that a first rechargeable battery 30 is or may be connected to interface device 4 by the connection of four connecting elements 17a, 17b, 17d, 17e to four terminal elements 15a, 15b, 15c, 15d as well as by the "free" (i.e. unconnected) fifth connecting element 17c. If control device 3 detects that interface device 4 is in the first position, the first configuration for supplying power tool 1 with voltage from first rechargeable battery 30 is selected in control device 3.

A second specific embodiment of power tool 1 is illustrated in FIGS. 5 and 6. The configuration for supplying power tool 1 with voltage according to the second specific embodiment is essentially identical to the configuration for supplying power tool 1 with voltage according to the first specific embodiment. In FIG. 4, interface device 4 is in the first position, and in FIG. 6, interface device 4 is in the second position. In contrast to the first specific embodiment, power tool 1 according to the second specific embodiment is configured in such a way that interface device 4 may be reversibly transferred from the first position to the second position by a displacement. To change interface device 4 from the first position to the second position, interface device 4 is displaced relative to housing 2 of charging device 1 in direction A (cf. FIG. 5). To return interface device 4 from the second position to the first position, interface device 4 is displaced relative to rechargeable battery holder 2 of charging device in direction B (cf. FIG. 6).

A third specific embodiment of power tool 1 is illustrated in FIGS. 7 and 8. According to the third specific embodiment, and in contrast to the first specific embodiment, interface device 4 is designed in the shape of a cuboid. Only a first side 14a, a second side 14b, a third side 14c and a fourth side 14d are illustrated in FIGS. 7 and 8. Interface device 4 includes a first terminal 15, a second terminal 16, a first connecting point 17 and a second connecting point 18. As illustrated in FIG. 7, first terminal 15 is positioned on first side 14a of interface device 4 designed as a cuboid. First connecting point 17 is positioned on second side 14b of the cuboid. Second terminal 16 is positioned on third side 14c of the cuboid. Second connecting point 18 is positioned on fourth side 14d of the cuboid. First terminal 15 includes four terminal elements 15a, 15b, 15c, 15d, and second terminal 16 includes five terminal elements 16a, 16b, 16c, 16d, 16e. First connecting point 17 includes four connecting elements 17a, 17b, 17c, 17d, and second connecting point 18 includes five connecting elements 18a, 18b, 18c, 18d, 18e. Moreover, control device 3 according to the third specific embodiment includes a first linking device 19 and a second linking device 20. First linking device 19, in turn, includes four links 19a, 19b, 19c, 19d, and second linking device 20 includes five links 20a, 20b, 20c, 20d, 20e. First linking device 19 is used to connect interface device 4 to control device 3 via first connecting point 17. Second linking device 20 is used to connect interface device 4 to control device 3 via second connecting point 18.

In FIG. 7, interface device 4 is shown in the first position, interface device 4 designed as a cuboid being oriented in relation to rechargeable battery holder 2 in such a way that first connecting point 17 is connected to first linking device 19. Four connecting elements 17a, 17b, 17c, 17d of first connecting point 17 are connected to four links 19a, 19b, 19c, 19d of first linking device 19. Four connecting elements 17a, 17b, 17c, 17d are connected to four terminal elements 15a, 15b, 15c, 15d via four connecting lines 11a, 11b, 11c, 11d. If first connecting point 17 is connected to first linking device 19, power tool 1 detects that interface device 4 is in the first position and that a first rechargeable battery 30 is or may be connected to first terminal 15. As a result, the first configuration for supplying power tool 1 with voltage from first rechargeable battery 30 is selected and set in control device 3.

To move interface device 4 designed as a cuboid according to the third specific embodiment of power tool 1 from the first position (FIG. 7) to the second position (FIG. 8), interface device 4 is removed from rechargeable battery holder 2, correspondingly rotated by 180° in arrow direction R and reconnected to rechargeable battery holder 2 (cf. FIG. 7 and FIG. 8).

In FIG. 8, interface device 4 is shown in the second position, interface device 4 designed as a cuboid being oriented in relation to rechargeable battery holder 2 of power tool 1 in such a way that second connecting point 17 is connected to second linking device 20. Five connecting elements 18a, 18b, 18c, 18d, 18e of second connecting point 18 are connected to five links 20a, 20b, 20c, 20d, 20e of second linking device 20. Five connecting elements 18a, 18b, 18c, 18d, 18e are connected to five terminal elements 16a, 16b, 16c, 16d, 16e via five connecting lines 12a, 12b, 12c, 12d, 12e. If second connecting point 18 is connected to second linking device 20, power tool 1 detects that interface device 4 is in the second position and that a second rechargeable battery 40 is connected or may be connected to second terminal 16. As a result, the second configuration for supplying power tool 1 with voltage from second rechargeable battery 40 is selected and set.

Figure 10:
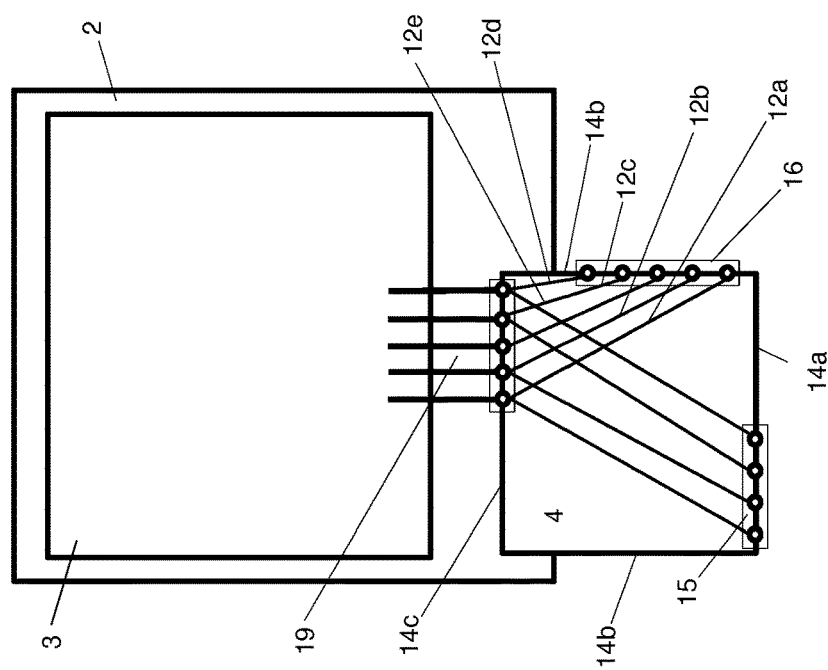
FIG. 10 shows a schematic view of the interface device in a second position according to the fourth specific embodiment.
Figure 9:
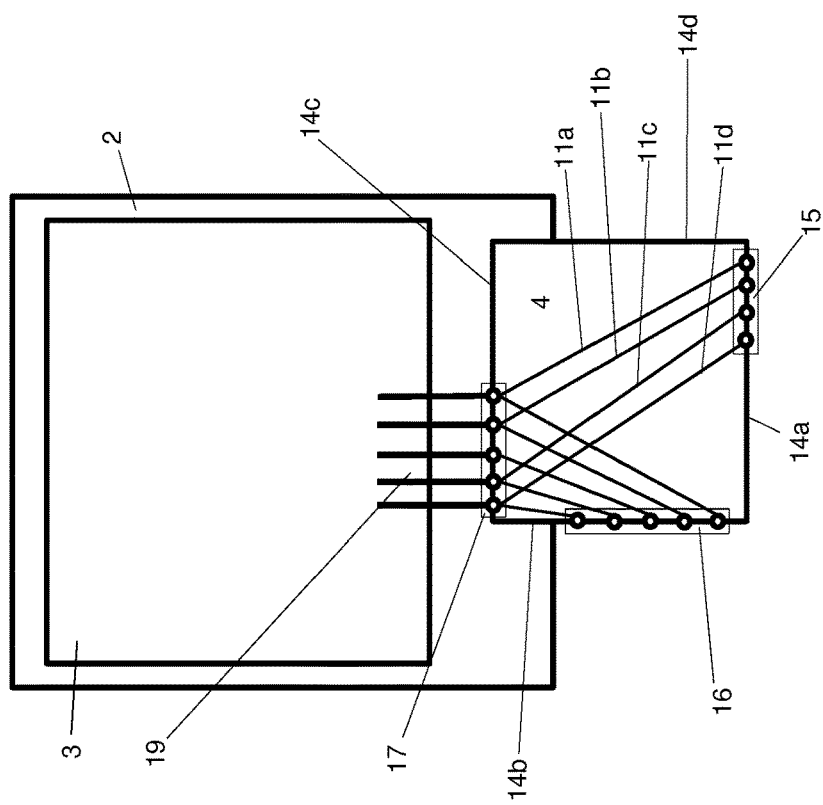
FIG. 9 shows a schematic view of the interface device in a first position according to a fourth specific embodiment.
Figure 16:
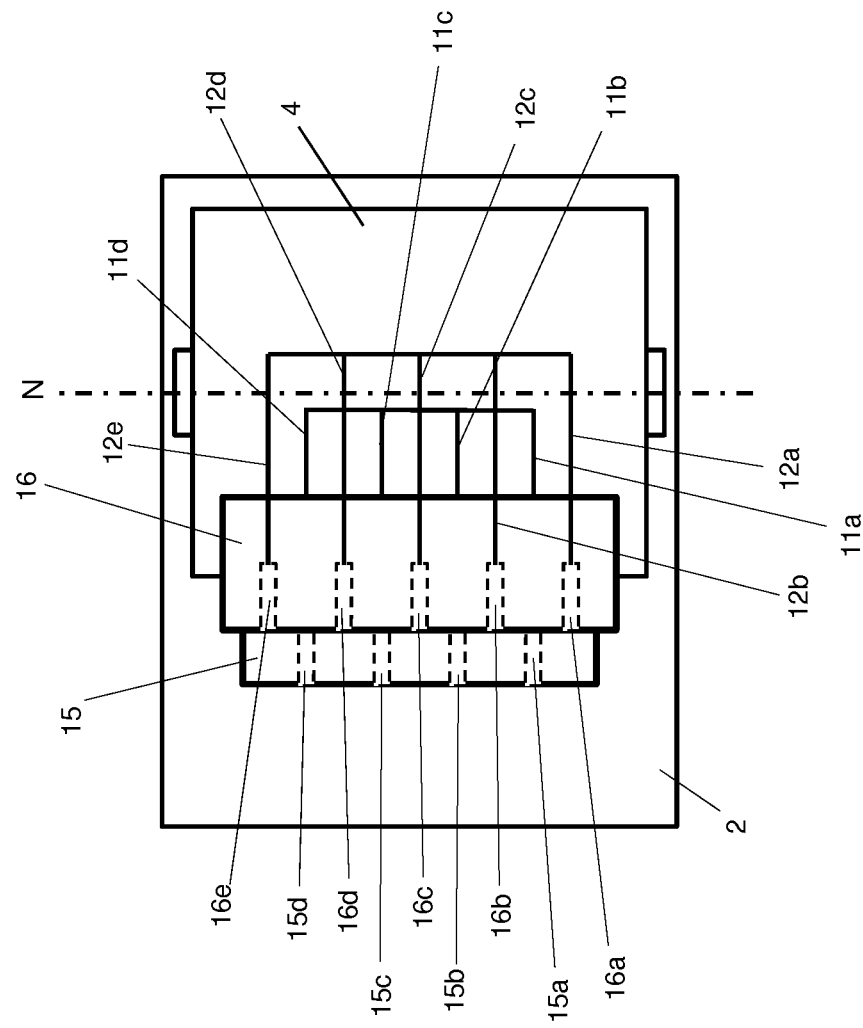
FIG. 16 shows a top view of the interface device in the first position according to the seventh specific embodiment and a first rechargeable battery.

A fourth specific embodiment of charging device 1 is illustrated in FIGS. 9 and 10. According to the fourth specific embodiment, and in contrast to the first specific embodiment, interface device 4 is also designed in the shape of a cuboid.

Only a first side 14a, a second side 14b, a third side 14c and a fourth side 14d are illustrated in FIGS. 7 and 8. Interface device 4 includes a first terminal 15, a second terminal 16, a connecting point 17. As illustrated in FIG. 7, first terminal 15 is positioned on first side 14a of interface device 4 designed as a cuboid. Second terminal 16 is positioned on second side 14b of the cuboid. Connecting point 17 is positioned on third side 14c of the cuboid. According to the fourth specific embodiment, power tool 1 includes a control device 3 which has only one linking device 19 along with five links 19a, 19b, 19c, 19d, 19e. Five links 19a, 19b, 19c, 19d, 19e are connected to five connecting elements 17a, 17b, 17c, 17d, 17e of connecting point 17. Connecting elements 17a, 17b, 17c, 17d, 17e, in turn, are connected to four terminal elements 15a, 15b, 15c, 15d of first terminal 15 as well as to five terminal elements 16a, 16b, 16c, 16d, 16e of second terminal 16 via corresponding connecting lines 12a, 12b, 12c, 12d, 12e. FIG. 7 shows interface device 4 in a first position, in which a first rechargeable battery 30 is connectable to first terminal 15. FIG. 8 shows interface device 4 in a second position, in which a second rechargeable battery 40 is connectable to second terminal 16. To transfer interface device 4 from the first position to the second position, interface device 4 must be removed from rechargeable battery holder 2 of power tool 1, correspondingly rotated by 180° and reconnected to rechargeable battery holder 2 of power tool 1.

If interface device 4 is in the first position, and a first rechargeable battery 30 is connected to first terminal 15, control device 3 detects that four terminal elements 15a, 15b, 15c, 15d of first terminal 15 are connected to four contacts 30a of first rechargeable battery 30. Due to the connection of four terminal elements 15a, 15b, 15c, 15d of first terminal 15 to particular assigned links 19a, 19b, 19c, 19d, 19e, control device 3 detects that a first rechargeable battery 30 is connected to first terminal 15. As a result, the first configuration for supplying power tool 1 with voltage from first rechargeable battery 30 is selected and set in control device 3.

If interface device 4 is now in the second position, and a second rechargeable battery 40 is connected to second terminal 16, control device 3 detects that five terminal elements 16a, 16b, 16c, 16d, 16e of second terminal 16 are connected to five contacts 40a of second rechargeable battery 40.

Due to the connection of five terminal elements 16a, 16b, 16c, 16d, 16e of second terminal 16 to particular assigned links 19a, 19b, 19c, 19d, 19e, control device 3 detects that second rechargeable battery 40 is connected to second terminal 16. As a result, the second configuration for supplying power tool 1 with voltage from second rechargeable battery 40 is selected and set in control device 3.

A fifth specific embodiment of power tool 1 is illustrated in FIGS. 11 and 12. The fifth specific embodiment of power tool 1 is essentially identical to the first and second specific embodiments of power tool 1. In contrast to the first and second specific embodiments, interface device 4 is designed in the shape of a cuboid. Only a first side 14a, a second side 14b, a third side 14c and a fourth side 14d are illustrated in FIGS. 11 and 12. Control device 3 includes a linking device 19, which has five links 19a, 19b, 19c, 19d, 19e. Interface device 4 includes a first terminal 15, which has four terminal elements 15a, 15b, 15c, 15d, and a second terminal 16, which has five terminal elements 16a, 16b, 16c, 16d, 16e. Interface device 4 furthermore includes a first connecting point 17, which has four connecting elements 17a, 17b, 17c, 17d, and a second connecting point 18, which has five connecting elements 18a, 18b, 18c, 18d, 18e. First terminal 15 is positioned on second side 14b of the cuboid. Second terminal 16 is positioned on fourth side 14d of the cuboid. First connecting point 17 is positioned on third side 14c of the cuboid, and second connecting point 18 is positioned on first side 14a of the cuboid.

FIG. 11 shows interface device 4 in the first position, four terminal elements 15a, 15b, 15c, 15d of first terminal 15 being connected to four connecting elements 17a, 17b, 17c, 17d of first connecting point 17 via four connecting lines 11a, 11b, 11c, 11d. Only four of five links 19a, 19b, 19c, 19d, 19e of linking device 19 are assigned in the first position. Connecting line 19c is not assigned. Due to the assignment of only four of five links 19a, 19b, 19c, 19d, 19e, control device 3 detects that interface device 4 is in the first position and that a first rechargeable battery 30 is connected or may be connected to first terminal 15. Due to the detection of the first position and first rechargeable battery 30, a first configuration for supplying power tool 1 with voltage from first rechargeable battery 30 is selected and set in control device 3.

To transfer interface device 4 from the first position to the second position, interface device 4 must be removed from rechargeable battery holder 2 of power tool 1, rotated by 180° in arrow direction R and reconnected to rechargeable battery holder 2 of power tool 1.

FIG. 12 shows interface device 4 in the second position, five terminal elements 16a, 16b, 16c, 16d, 16e of second terminal 16 being connected to five connecting elements 18a, 18b, 18c, 18d, 18e of second connecting point 18 via connecting lines 12a, 12b, 12c, 12d, 12e. Five links 19a, 19b, 19c, 19d, 19e of linking device 19 are assigned in the second position. Due to the assignment of five links 19a, 19b, 19c, 19d, 19e, control device 3 detects that interface device 4 is in the second position and that a second rechargeable battery 40 is connected or may be connected to second terminal 16. Due to the detection of the second position and second rechargeable battery 40, a second configuration for supplying power tool 1 with voltage from second rechargeable battery 40 is selected and set in control device 3.

A sixth specific embodiment of power tool 1 is illustrated in FIGS. 13 and 14. The sixth specific embodiment of power tool 1 is essentially identical to the fifth specific embodiment of power tool 1. Interface device 4 is designed in the shape of a cuboid. Only a first side 14a, a second side 14b, a third side 14c and a fourth side 14d are illustrated in FIGS. 11 and 12.

In contrast to the fifth specific embodiment of power tool 1, control device 3 according to the sixth specific embodiment of power tool 1 includes a first circuit board 21 having a first linking device 19 along with four links 19a, 19b, 19c, 19d as well as a second circuit board 22 having a second linking device 20 along with five links 20a, 20b, 20c, 20d, 20e. First circuit board 21 includes a first configuration for supplying power tool 1 with voltage from first rechargeable battery 30, and second circuit board 22 includes a second configuration for supplying power tool 1 with voltage from second rechargeable battery 40.

Interface device 4 according to the sixth specific embodiment is essentially identical to interface device 4 according to the fifth specific embodiment.

First linking device 19 is used to connect first circuit board 21 to first connecting point 17, and second linking device 20 is used to connect second circuit board 22 to second connecting point 18. Four connecting elements 17a, 17b, 17c, 17d of first connecting point 17 are connected to four terminal elements 15a, 15b, 15c, 15d of first terminal 15 via four connecting lines 11a, 11b, 11c, 11d. Five connecting elements 18a, 18b, 18c, 18d, 18e of second connecting point 18 are connected to five terminal elements 16a, 16b, 16c, 16d, 16e of second terminal 16 via five connecting lines 12a, 12b, 12c, 12d, 12e.

If interface device 4 is in the first position (cf. FIG. 13), four links 19a, 19b, 19c, 19d of first linking device 19 are connected to four connecting elements 17a, 17b, 17c, 17d of first connecting point 17. Four connecting elements 17a, 17b, 17c, 17d are connected to four terminal elements 15a, 15b, 15c, 15d of first terminal 15 via four connecting lines 11a, 11b, 11c, 11d. A first rechargeable battery 30 may now be connected to first terminal 15. If interface device 4 is in the first position, first circuit board 21 detects that interface device 4 is set to the first position and a first rechargeable battery 30 is connected or may be connected to first terminal 15 based on the assignment of four links 19a, 19b, 19c, 19d by four connecting elements 17a, 17b, 17c, 17d of first connecting point 17. As a result, the first configuration for supplying power tool 1 with voltage from first rechargeable battery 30 is activated in first circuit board 21 of control device 3.

To move interface device 4 designed as a cuboid according to the sixth specific embodiment of power tool 1 from the first position (FIG. 13) to the second position (FIG. 14), interface device 4 is removed from rechargeable battery holder 2 of power tool 1, correspondingly rotated by 180° in arrow direction R and reconnected to rechargeable battery holder 2 of power tool 1 (cf. FIG. 13 and FIG. 14).

If interface device 4 is now in the second position (cf. FIG. 14), five links 20a, 20b, 20c, 20d, 20e of second linking device 20 are connected to five connecting elements 18a, 18b, 18c, 18d, 18e of second connecting point 18. Five connecting elements 17a, 17b, 17c, 17d, 17e are connected to five terminal elements 16a, 16b, 16c, 16d, 16e of second terminal 16 via five connecting lines 12a, 12b, 12c, 12d, 12e. A second rechargeable battery 40 may now be connected to second terminal 16. If interface device 4 is in the second position, second circuit board 22 detects that interface device 4 is set in the second position and a second rechargeable battery 40 is connected or may be connected to second terminal 16 based on the assignment of five links 20a, 20b, 20c, 20d, 20e by five connecting elements 18a, 18b, 18c, 18d, 18e of second connecting point 18. As a result, the second configuration for supplying power tool 1 with voltage from second rechargeable battery 40 is activated in second circuit board 22 of control device 3.

According to other specific embodiments which are not illustrated in the figures or described in greater detail, it is possible that interface device 4 according to the third through sixth specific embodiments of power tool 1 (cf. FIGS. 7 through 14) is not designed in the shape of a cuboid but is designed in another suitable shape.

Figure 17:
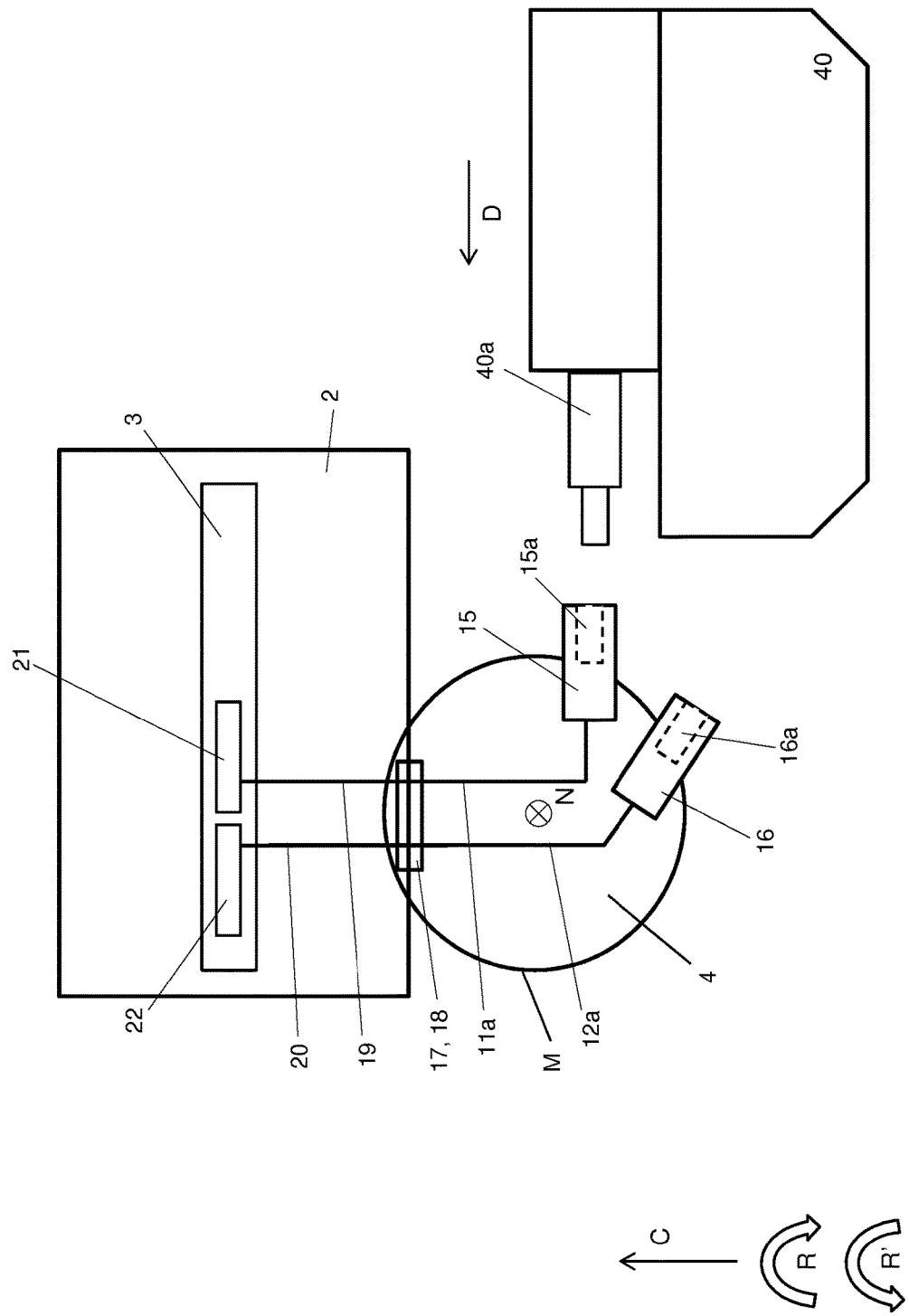
FIG. 17 shows a side view of the interface device in a second position according to the seventh specific embodiment and a second rechargeable battery.

A seventh specific embodiment of power tool 1 is illustrated in FIGS. 15, 16, 17 and 18, which is essentially identical to the sixth specific embodiment of power tool 1. Power tool 1 according to the seventh specific embodiment is illustrated in FIG. 15 together with a first rechargeable battery 30. Power tool 1 according to the seventh specific embodiment is illustrated in FIG. 17 together with a second rechargeable battery 40.

According to the seventh specific embodiment, and in contrast to the sixth specific embodiment, interface device 4 has a cylindrical shape, including an essentially circular cross-sectional surface.

Interface device 4 is reversible from the first position (FIGS. 15, 16) to the second position (FIGS. 17, 18) and is swivelable relative to rechargeable battery holder 2 around axis N in direction R or R'. First terminal 15 and second terminal 16 are positioned on lateral surface M of interface device 4 designed as a cylinder in such a way that first terminal 15 is situated under second terminal 16 in direction C.

The connection of first terminal 15 to first circuit board 21 of control device 3 via four connecting elements 17*a*, 17*b*, 17*c*, 17*d* and four links 19*a*, 19*b*, 19*c*, 19*d*, and the connection of second terminal 16 to second circuit board 22 of control device 3 via five connecting elements 18*a*, 18*b*, 18*c*, 18*d*, 18*e* and five links 20*a*, 20*b*, 20*c*, 20*d*, 20*e*, correspond to the design in FIGS. 13 and 14.

To connect a contact 30*a* of first rechargeable battery 30 to first terminal 15 of interface device 4, interface device 4 is moved into the first position, and first rechargeable battery 30 is moved onto interface device 4 in direction D (cf. FIG. 15). If contact 30*a* of first rechargeable battery 30 is connected to first terminal 15, the first configuration for supplying power tool 1 with voltage from first rechargeable battery 30 is activated in first circuit board 21 of control device 3.

Conversely, to connect a contact 40*a* of second rechargeable battery 40 to second terminal 16 of interface device 4, interface device 4 is moved into the second position, and second rechargeable battery 40 is moved onto interface device 4 in direction D (cf. FIG. 17). If contact 40*a* of second rechargeable battery 40 is connected to second terminal 16, the second configuration for supplying power tool 1 with voltage from second rechargeable battery 40 is activated in second circuit board 22 of control device 3.

Figure 18:
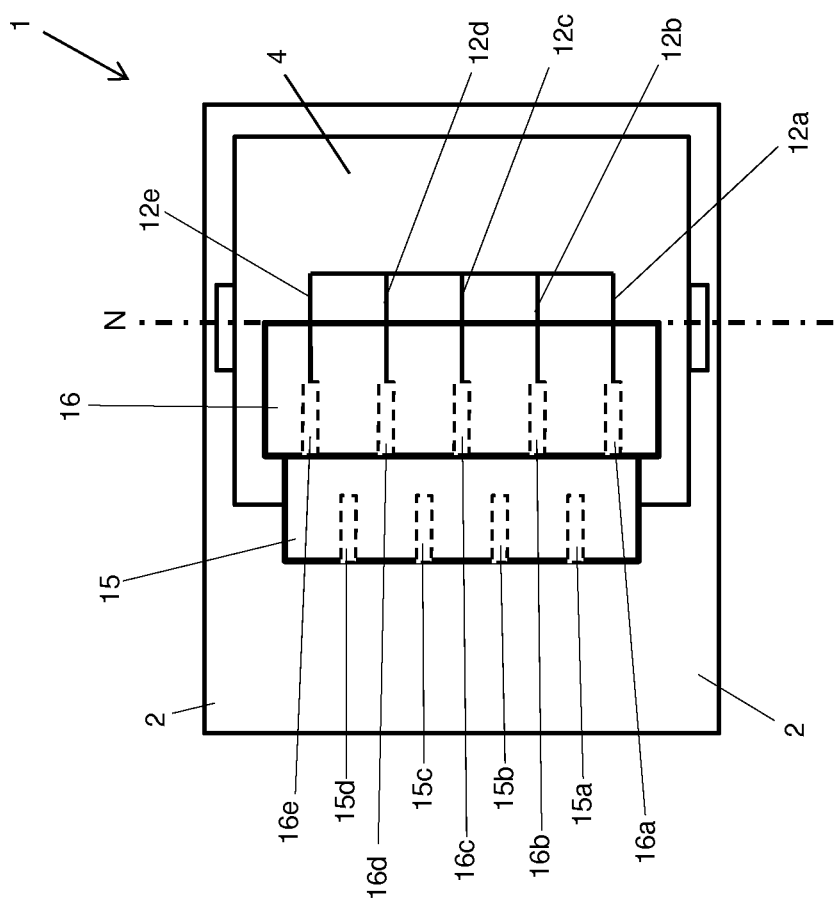
FIG. 18 shows a top view of the charging device according to the present invention according to the seventh specific embodiment, including the interface device in a second position.
Figure 19:
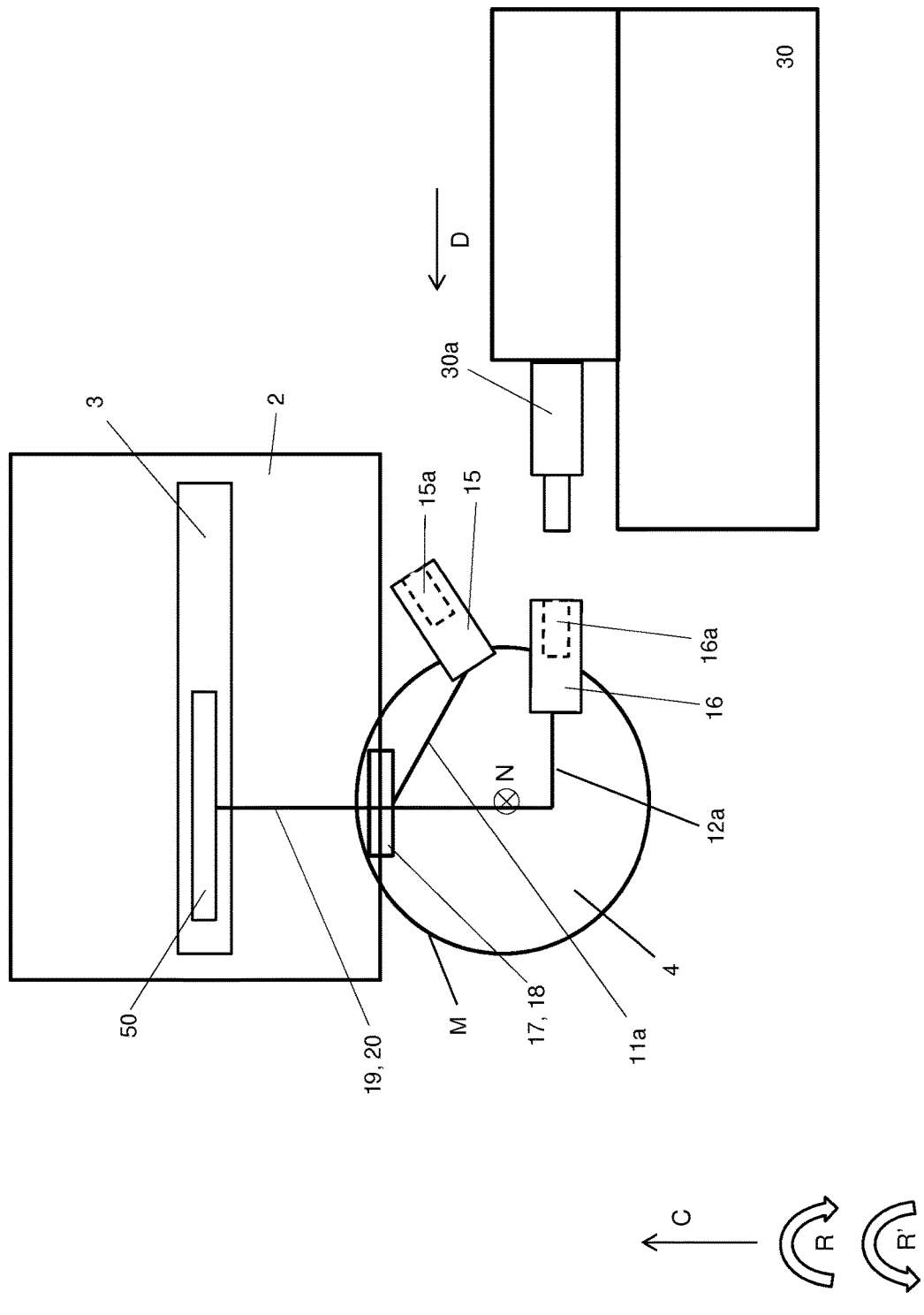
FIG. 19 shows a side view of the charging device according to the present invention according to an eighth specific embodiment, including the interface device in a first position and a first rechargeable battery.
Figure 20:
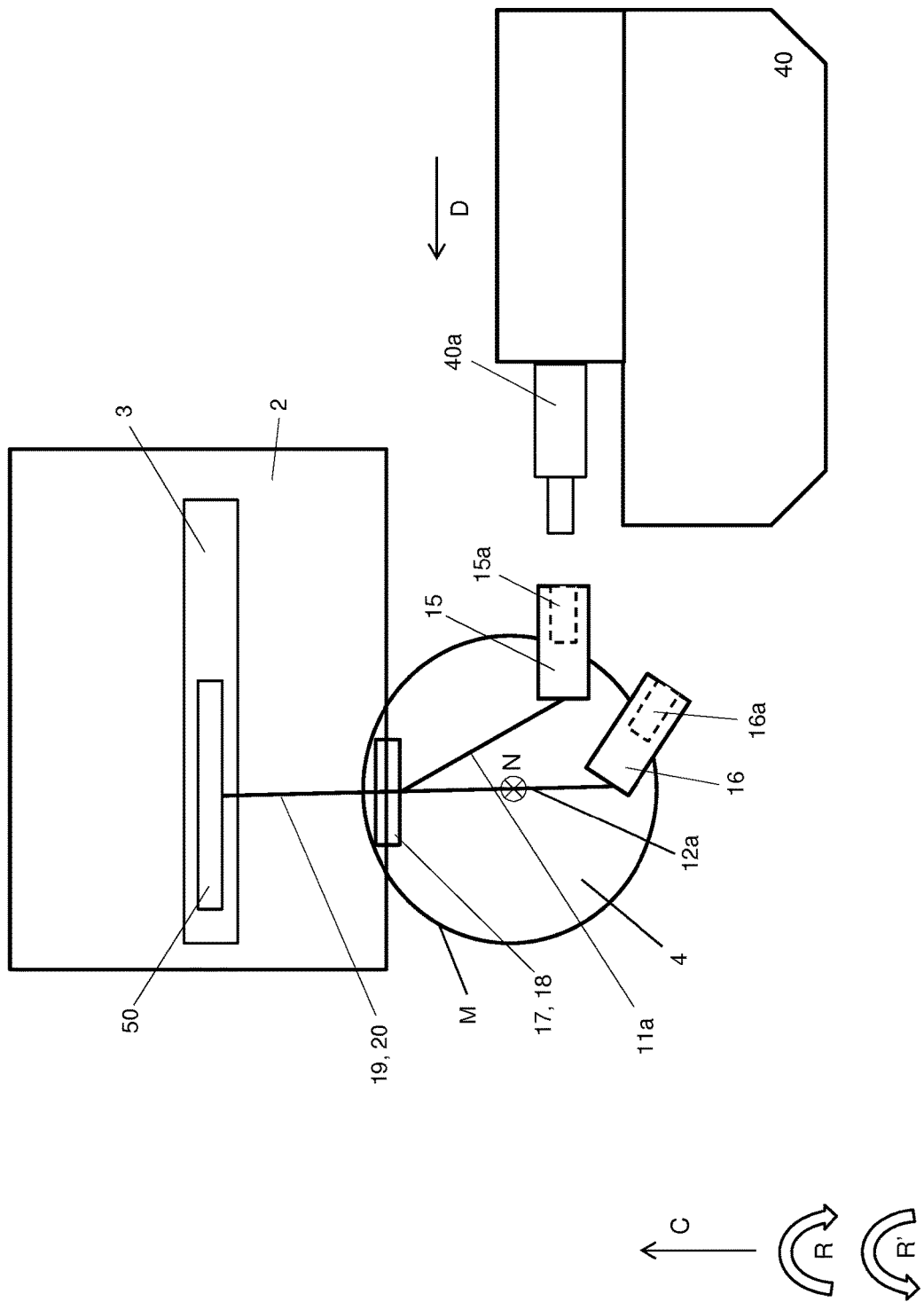
FIG. 20 shows a side view of the charging device according to the present invention according to the eighth specific embodiment, including the interface device in a second position and a second rechargeable battery.

An eighth specific embodiment of power tool 1 is illustrated in FIGS. 19 and 20, which is essentially identical to the fourth specific embodiment of power tool 1. Power tool 1 according to the eighth specific embodiment is illustrated in FIG. 19 together with a first rechargeable battery 30. Power tool 1 according to the eighth specific embodiment is illustrated in FIG. 18 together with a second rechargeable battery 40.

The structure of power tool 1 and interface device 4 according to the eighth specific embodiment essentially corresponds to the structure of power tool 1 and interface device 4 according to the seventh specific embodiment (cf. FIGS. 15, 16, 17 and 18). In contrast to the sixth specific embodiment, power tool 1 includes only one linking device 20 along with five links 20*a*, 20*b*, 20*c*, 20*d*, 20*e* for connecting interface device 4 to control device 3.

To connect contact point 30*a* of first rechargeable battery 30 to first terminal 15 of interface device 4, interface device 4 is moved into the first position, and first rechargeable battery 30 is moved onto interface device 4 in direction D (cf. FIG. 19). If contact point 30*a* of first rechargeable battery 30 is connected to first terminal 15, the first configuration for supplying power tool 1 with voltage from first rechargeable battery 30 is activated in circuit board 50 of control device 3.

Conversely, to connect contact point 40*a* of second rechargeable battery 40 to second terminal 16 of interface device 4, interface device 4 is moved into the second position, and second rechargeable battery 40 is moved onto interface device 4 in direction D (cf. FIG. 20). If contact point 40*a* of second rechargeable battery 40 is connected to second terminal 16, the second configuration for supplying power tool 1 with voltage from second rechargeable battery 40 is activated in circuit board 50 of control device 3.

The first or second configuration for supplying power tool 1 with voltage from first rechargeable battery 30 or second rechargeable battery 40 is activated after control device 3 detects that first rechargeable battery 30 or second rechargeable battery 40 is connected to first terminal 15 or second terminal 16. The detection takes place on the basis of the setting of interface device 4 in the first or second position with the aid of a microswitch, which is not illustrated.

Alternatively, the detection takes place on the basis of the transmission of an item of information or a data set from particular rechargeable battery 30, 40 to control device 3 via one of connecting lines 11*a*, 11*b*, 11*c*, 11*d*, 12*a*, 12*b*, 12*c*, 12*d*, 12*e* and links 20*a*, 20*b*, 20*c*, 20*d*, 20*e*. Each particular first or second rechargeable battery 30, 40 transmits an identifier for its identification to control device 3.

Alternatively, the detection takes place on the basis of the number of particular assigned links 20*a*, 20*b*, 20*c*, 20*d*, 20*e*, only four links 20*a*, 20*b*, 20*d*, 20*e* being assigned if first rechargeable battery 30 is connected to first terminal 15, and conversely five links 20*a*, 20*b*, 20*c*, 20*d*, 20*e* being assigned if second rechargeable battery 40 is connected to second terminal 16. The assignment of links 20*a*, 20*b*, 20*c*, 20*d*, 20*e* is detected by control device 3, whereby the first configuration or the second configuration for supplying power tool 1 with voltage from first rechargeable battery 30 or second rechargeable battery 40 is correspondingly activated.

What is claimed is:

1. A power tool comprising:
   a control device; and
   at least one electromechanical interface device for connecting at least one rechargeable battery to the power tool and for supplying the power tool with voltage from the rechargeable battery, the interface device including at least one first terminal and a second terminal, the interface device being settable to at least one first position and to a second position, the first terminal being usable to supply the power tool with voltage from a first rechargeable battery when the interface device is set in the first position, and the second terminal being usable to supply the power tool with voltage from a second rechargeable battery when the interface device is set in the second position;
   wherein the first terminal includes a first number of terminal elements, and the second terminal includes a second number of terminal elements, the first number of terminal elements corresponding to a first rechargeable battery contact element number of contact elements of the first rechargeable battery, and the second number of terminal elements corresponding to a second rechargeable battery contact element number of contact elements of the second rechargeable battery; and
   wherein the interface device includes a first connecting point and a second connecting point for connecting the interface device to the control device, the first connecting point having a first number of connecting elements, and the second connecting point having a second number of connecting elements, the first number of connecting elements corresponding to the first number of terminal elements, and the second number of connecting elements corresponding to the second number of terminal elements.

2. The power tool as recited in claim 1 wherein a first configuration for supplying the power tool with voltage from a first rechargeable battery is selected when the interface device is set in the first position and the first rechargeable battery is connected to the first terminal, and a second configuration for supplying the power tool with voltage from a second rechargeable battery is selected when the interface device is set in the second position and the second rechargeable battery is connected to the second terminal.

3. The power tool as recited in claim 1 wherein the first or second position of the interface device or the first or second rechargeable battery connected to the interface device is detectable based on a number of connections between the terminal elements of the first and second terminals and the connecting elements of connecting points of the interface device.

4. The power tool as recited in claim 1 wherein at least one first terminal element of the first terminal as well as at least one second terminal element of the second terminal is configured at least to receive information from the first rechargeable battery and the second rechargeable battery at the power tool, so that a first configuration for supplying the power tool with voltage from a first rechargeable battery or a second configuration for supplying the power tool with voltage from a second rechargeable battery is settable according to the particular first or second rechargeable battery connected.

5. The power tool as recited in claim 1 further comprising at least one microswitch for detecting whether the interface device is set to the first position or the second position.

* * * * *